(12) United States Patent
Westmoreland (10) Patent No.: US 9,993,115 B2
(45) Date of Patent: Jun. 12, 2018

(54) SPATULA CULINARY UTENSIL AND METHODS OF USE

(71) Applicant: J&G Products, LLC, Centennial, CO (US)

(72) Inventor: Glenn W. Westmoreland, Centennial, CO (US)

(73) Assignee: J&G Products, LLC, Centennial, CO (US)

( * ) Notice: Subject to any disclaimer, the term of this patent is extended or adjusted under 35 U.S.C. 154(b) by 0 days. days.

(21) Appl. No.: 15/113,817

(22) PCT Filed: Aug. 10, 2015

(86) PCT No.: PCT/US2015/044494
§ 371 (c)(1),
(2) Date: Jul. 22, 2016

(87) PCT Pub. No.: WO2017/027005
PCT Pub. Date: Feb. 16, 2017

(65) Prior Publication Data
US 2017/0224173 A1    Aug. 10, 2017

(51) Int. Cl.
*A47J 43/28*    (2006.01)
(52) U.S. Cl.
CPC ........... *A47J 43/288* (2013.01); *A47J 43/283* (2013.01)
(58) Field of Classification Search
CPC ..... A47J 43/283; A47J 43/288; A47G 21/045; A47G 21/10
(Continued)

(56) References Cited

U.S. PATENT DOCUMENTS 2,800,714 A    6/1954   Evans
2,804,335 A *  8/1957   Stillgebauer ......... A47G 21/045
                                                      294/32
(Continued)

FOREIGN PATENT DOCUMENTS

CH         696 959      *  2/2008
JP       199800192165      7/1998
(Continued)

OTHER PUBLICATIONS

International Search Report for PCT/US2015/044494; dated May 10, 2016; (three pages).
(Continued)

*Primary Examiner* — Dean J Kramer
(74) *Attorney, Agent, or Firm* — Terrence M. Wyles, Esq.; Startup IP Law, LLC (57) ABSTRACT

What is disclosed an improved spatula-tong combination culinary tool, wherein the tong member is coupled to the spatula member in a way such that the tong member is movable to and from one side of the spatula member via a hinged/pivotable/rotatable coupling, and wherein the hinged/pivotable/rotatable coupling is disposed such that the tong member can bias food from a cooking surface onto the spatula from the side of the spatula and the axis of rotation of the tong member is orthogonal with respect to the planar surface of the spatula. In variations, the tool-heads of the improved culinary tool are detachably removable and changeable to other tool members, including the ability to interchange the positions of the spatula member and the tong member, in case a user prefers to bias target food items onto the spatula member from one side or another.

55 Claims, 5 Drawing Sheets

(58) Field of Classification Search
USPC .......................................... 294/3, 7, 8, 99.2
See application file for complete search history.

(56) References Cited

U.S. PATENT DOCUMENTS

| | | | | |
|---|---|---|---|---|
| 2,862,754 | A * | 12/1958 | Forcia | A47G 21/045 |
| | | | | 294/7 |
| 2,916,320 | A * | 12/1959 | Adams | A47J 43/283 |
| | | | | 294/26.5 |
| 4,711,029 | A * | 12/1987 | Somerset | A47J 43/288 |
| | | | | 294/7 |
| 5,149,161 | A * | 9/1992 | Smith | A21O 5/00 |
| | | | | 294/26.5 |
| 5,206,998 | A * | 5/1993 | Oriente | A47J 37/0786 |
| | | | | 294/10 |
| 5,447,351 | A * | 9/1995 | Klunder | A47G 21/10 |
| | | | | 16/431 |
| 6,012,750 | A * | 1/2000 | Swartz | A47J 43/288 |
| | | | | 294/7 |
| 6,237,226 | B1 * | 5/2001 | Huang | A47G 21/02 |
| | | | | 30/322 |
| 6,247,736 | B1 * | 6/2001 | Esterson | A47J 43/288 |
| | | | | 294/7 |
| 7,011,015 | B1 * | 3/2006 | Marghella | A47J 43/20 |
| | | | | 294/7 |
| D519,332 | S | 4/2006 | Sanchez | |
| 7,784,188 | B1 | 8/2010 | Yackshaw | |
| 8,459,708 | B1 | 6/2013 | Sandorfi | |
| D718,095 | S | 11/2014 | Sullivan, Jr. et al. | |
| D720,966 | S | 1/2015 | Sullivan | |
| 2004/0026939 | A1 | 2/2004 | Jordan et al. | |
| 2006/0202494 | A1 | 9/2006 | Paolo | |
| 2008/0036226 | A1 * | 2/2008 | Yoon | A47G 21/06 |
| | | | | 294/3 |
| 2009/0243317 | A1 * | 10/2009 | Li | A47G 21/10 |
| | | | | 294/3 |
| 2012/0043774 | A1 | 12/2012 | Floyd et al. | |
| 2014/0110957 | A1 | 4/2014 | Torres | |

FOREIGN PATENT DOCUMENTS

| | | |
|---|---|---|
| JP | 2009183631 | 8/2009 |
| JP | 2011161188 | 8/2011 |
| JP | 2015054231 | 3/2015 |
| KR | 2019950029447 | 11/1995 |
| KR | 200335490 | 12/2003 |
| KR | 2020030029170 | 12/2003 |
| KR | 1020110033001 | 10/2012 |
| KR | 1020120115459 | 10/2012 |
| WO | WO2011100231 | 8/2011 |
| WO | WO2012055779 | 5/2012 |

OTHER PUBLICATIONS

Written Opinion of the International Searching Authority for PCT/US2015/044494; dated May 10, 2016; (six pages).

* cited by examiner

SPATULA CULINARY UTENSIL AND METHODS OF USE

BACKGROUND

The present inventive disclosure relates to culinary utensils used to grasp and/or control food items during the preparation or serving of food, whether in the kitchen, outdoor barbeque, or other setting where food is being prepared for consumption or is being offered for serving.

Typically, in culinary venues, there are a variety of culinary utensils used to manipulate food items, including food items being prepared on cooking surfaces such as pans, griddles, and grills. Usually, one or more spatula tools are available and at least one pair of traditional tongs are available. With respect to spatulas, when being used to slide under a food item; e.g., a hamburger patty on a grill; the user must try to slide the spatula under the food member by introducing its longitudinally distal end/edge under the food item and thrust under the food item to hopefully manipulate the food item fully onto and substantially centered on the spatula's upper surface. What instead often happens is that the user often "chases" the target food item around the cooking surface as the spatula edge contacts the proximal end of the target food item, and the "chase" does not end until the side of the pan, grill, etc. is encountered by the food item to for it to stay in place such that the spatula can be successfully slipped underneath. In the case of an outdoor grill, this can result in potentially unwanted grease and/or soot contacting the distal end of the target food item, in addition to being frustrating to the cook. Moreover, a similar result occurs if a user attempts to slidably engage a target food item with the side of a typical spatula tool.

There exists in the art many various spatulas that incorporate some sort of clamping utensil to help secure/grasp food downward onto the upper spatula surface (see, e.g., U.S. Patent Application Publication No. 2006/0202494 to Di Paolo and U.S. Pat. No. D519,332 to Sanchez, among others). However, no culinary utensils known in the art enable a user to easily direct a target food item onto the majority of the upper surface area of a spatula. What is needed is a culinary tool to provide greater control to a user to accomplish this.

BRIEF SUMMARY

The present inventive disclosure is generally directed to an improved spatula-tong combination device for use in the culinary arts, wherein the tong member is coupled to the grip shaft of the spatula member in a way such that the tong member is movable to and from one of the sides of the spatula member via a hinge or other pivotable/rotatable coupling, and wherein the hinged/pivotable/rotatable coupling is disposed such that the tong member can bias food on a cooking surface onto the spatula from the side of the spatula. That is, the axis of rotation of the tong member is orthogonal with respect to the planar surface of the spatula. In some variations, the spatula head has beveled edges on the side to help facilitate the sliding of food onto the spatula surface from the side. In other variations, the distal end of the tong member has a lower edge without gaps adapted to slidably interact with a cooking surface to help gather liquids/sauces from a food surface onto the spatula surface. In still more variations, the distal end of the tong member has various edging or "teeth" to help interact with food items. In even more embodiments, the tool-heads at the end of each arm of the improved culinary tool are detachably removable and changeable to other tool members, including the ability to interchange the positions of the spatula tool-head member and the tong tool-head member, in case a user prefers to bias target food items onto the spatula member from one side or another.

The foregoing Brief Summary is intended to merely provide a short, general overview of the inventive disclosure described throughout this document, and therefore, is not intended to limit the scope of the inventive disclosure contained throughout the balance of this document, including the appended claims and drawings.

DESCRIPTION

I. Overview

The present inventive disclosure is generally directed to an improved spatula-tong combination device for use in the culinary arts, wherein the tong member is coupled to the grip shaft of the spatula member in a way such that the tong member is movable to and from one of the sides of the spatula member via a hinge or other pivotable/rotatable coupling, and wherein the hinged/pivotable/rotatable coupling is disposed such that the tong member can bias food on a cooking surface onto the spatula from the side of the spatula. That is, the axis of rotation of the tong member is orthogonal with respect to the planar surface of the spatula. In some variations, the spatula head has beveled edges on the side to help facilitate the sliding of food onto the spatula surface from the side. In other variations, the distal end of the tong member has a lower edge without gaps adapted to slidably interact with a cooking surface to help gather liquids/sauces from a food surface onto the spatula surface. In still more variations, the distal end of the tong member has various edging or "teeth" to help interact with food items. In even more embodiments, the tool-heads at the end of each arm of the improved culinary tool are detachably removable and changeable to other tool members, including the ability to interchange the positions of the spatula tool-head member and the tong tool-head member, in case a user prefers to bias target food items onto the spatula member from one side or another.

II. Terminology

The terms and phrases as indicated in quotes (" ") in this Section are intended to have the meaning ascribed to them in this Terminology Section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification and the appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" and similar phrases in various places in the specification are not necessarily all meant to refer to the same embodiment.

The term "couple" or "coupled", as used in this specification and the appended claims, refers to either an indirect or a direct connection between the identified elements, components, or objects. Often the manner of the coupling will be related specifically to the manner in which the two coupled elements interact.

The term "removable", "removably coupled", "readily removable", "readily detachable", "detachably coupled", and similar terms, as used in this specification (including the claims and drawings), refer to structures that can be uncoupled from an adjoining structure with relative ease (i.e., non-destructively and without a complicated or time-consuming process) and that can also be readily reattached or coupled to the previously adjoining structure.

Directional and/or relational terms such as, but not limited to, left, right, nadir, apex, top, bottom, vertical, horizontal, back, front, lateral, proximal, and distal are relative to each other, are dependent on the specific orientation of an applicable element or article, are used accordingly to aid in the description of the various embodiments, and are not necessarily intended to be construed as limiting in this specification and the appended claims.

As applicable, the terms "about" or "generally", as used herein unless otherwise indicated, means a margin of +−20%. Also, as applicable, the term "substantially" as used herein unless otherwise indicated means a margin of +−10%. It is to be appreciated that not all uses of the above terms are quantifiable such that the referenced ranges can be applied.

III. An Improved Spatula-Tong Combination Culinary Tool

This Section III is generally directed to embodiments of an improved spatula-tong combination device for use in the culinary arts, wherein the tong (/gathering) member is coupled to the grip shaft of the spatula member in a way such that the tong (/gathering) member is movable to and from one of the sides of the spatula member via a hinge or other pivotable/rotatable coupling, and wherein the hinged/pivotable/rotatable coupling is disposed such that the tong (/gathering) member can bias food on a cooking surface onto the spatula from the side of the spatula. That is, the axis of rotation of the tong (/gathering) member is orthogonal with respect to the planar surface of the spatula. In some variations, the spatula head has beveled edges on the side to help facilitate the sliding of food onto the spatula surface from the side. In other variations, the distal end of the tong (/gathering) member has a lower edge without gaps adapted to slidably interact with a cooking surface to help gather liquids/sauces from a food surface onto the spatula surface. In still more variations, the distal end of the tong (/gathering) member has various edging or "teeth" to help interact with food items. In even more embodiments, the tool-heads at the end of each arm of the improved culinary tool are detachably removable and changeable to other tool members, including the ability to interchange the positions of the spatula tool-head member and the tong (/gathering) tool-head member, in case a user prefers to bias target food items onto the spatula member from one side or another.

Refer to FIGS. 1-9. In an embodiment, the improved combination culinary tool 1 comprises a first elongate member 3A with a first handle member 4A (hereinafter a first elongate handle member 3A/4A) having a first end and a second end, a second elongate member 3B with a second handle member 4B (hereinafter a second elongate handle member 3B/4B) having a first end and a second end. A pivotable/rotatable coupling 5 is disposed between the first end of the first elongate handle member 3A/4A and the first end of the second elongate handle member 3B/4B, wherein the pivotable coupling 5 is mechanically biased to cause the first and second elongate handle members 3A/4A, 3B/4B to be positioned apart at a predetermined "open" angle relative to each other, and the second ends of the first and second elongate handle members 3A/4A, 3B/4B can be pivoted toward each other by user force. The pivotable coupling 5 can be of any of many configurations already well-known in the art that are used for culinary tongs, such as, for example, as single curved-metal member with spring-like characteristics or a spring-hinge. In variations, the mechanically biased predetermined "open" angle between said first and second elongate handle members 3A/4A, 3B/4B when positioned apart is greater-than-or-equal-to 15 degrees and less-than-or-equal-to 45 degrees.

Disposed at the end of said first elongate handle member 3A/4A is a spatula member 2 (with or without beveled edges 2A at its exposed peripheral edges, sloping from the top surface plane to the bottom surface plane) that has a generally flat top and bottom planar surface disposed at the second end of the first elongate handle member 3A/4A, wherein relative to the first elongate handle member 3A/4A, the spatula member 2 has a distal edge, a right edge, and a left edge for slidably engaging food. The improved combination culinary tool 1 also includes a gathering member 6 disposed at the second end of the second elongate handle member 3B/4B, wherein the gathering member 6 has a distal end and a proximal end, relative to the second end of the second elongate handle member 3B/4B. It should be appreciated by those skilled in the art that even though the Figures depict the second elongate handle member 3B/4B as disposed on the right-hand side of the first elongate handle member 3A/4A, in other embodiments, the second elongate handle member 3B/4B can be disposed on the left-hand side of the first elongate handle member 3A/4A, which some users (e.g., left-handed users) might prefer when trying to bias a target food item onto the spatula member 2.

The gathering member 6 has a top edge and a bottom edge, with the bottom edge substantially aligned with at least one of the spatula member's 2 left or right edges when the first and second elongate handle members 3A, 4A; 3B, 4B are pivoted toward each other to be substantially parallel with one another. Finally, in typical variations, most of the surface area of the gathering member 6 is substantially orthogonally oriented relative to the planar surface of the spatula member 2 when drawn together. In variations, the surface area of the gathering member 6 has a lower edge without gaps adapted to slidably interact with a flat cooking surface to help a user gather liquids/sauces from a food surface onto the spatula 2 surface. In still more optional embodiments, the bottom edge of the gathering member 6 is angled toward said closest spatula member 2 edge in order to enhance the ability of the gathering member's 6 bottom edge to scrape and capture liquids and substances and direct them onto the spatula member 2 when the first and second elongated handle members 3A/4A, 3B/4B are manipulated toward each other. In variations, the spatula member 2 is polygonal shaped with an expanding width toward the distal end to form an angle that aids the parallel mating of a side edge of the spatula member 2 with the lower edge of the gathering member 6.

The result of this overall basic configuration is that the gathering member 6 can be pivoted by a user toward one of the spatula member's 2 right edge or left edge to efficiently bias target food items onto the spatula member's 2 planar surface.

In many embodiments, the major components of the improved combination culinary tool 1 are substantially comprised of high-temperature-resistant, rigid materials selected from the group comprising stainless steel, carbon composite materials, heat-resistant plastics, wood, and a combination of any of the aforementioned materials. In even more variations, the surface areas of one or more of the tool heads 2, 6 of the improved combination culinary tool 1 are comprised of non-stick material, which can include polytetrafluoroethylene (PTFE).

In some embodiments, to aid in the effectiveness of the improved spatula-tong combination device 1, the first and second elongate handle members 3A, 4A; 3B, 4B, when closed together, are each angled upward from said spatula member planar surface at a predetermined angle. In variations, that predetermined upward angle is greater-than-or-equal to 15 degrees and less-than-or-equal-to 45 degrees.

In other variations, the spatula member 2, includes at least one planar edge that is configured with teeth-like structures for tenderizing. In additional embodiments, at least one of the top or bottom edges of the gathering member 6 includes a plurality of gripping protrusions (e.g., "teeth-like" structures, tines, and/or scalloped edges).

Figure 1:
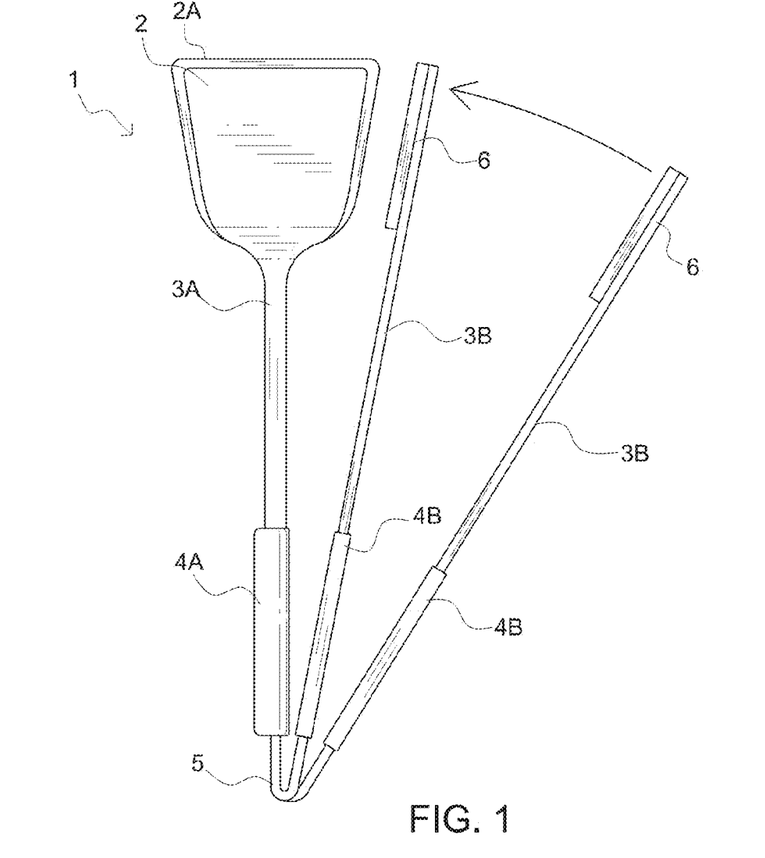
FIG. 1 depicts one embodiment of a top view of one embodiment of an improved spatula that incorporates a laterally oriented tong member, that when said tong member is moved by a user toward the spatula member, a target food item can be slidably pushed onto the spatula member via one of the side edges of the spatula member.
Figure 2:
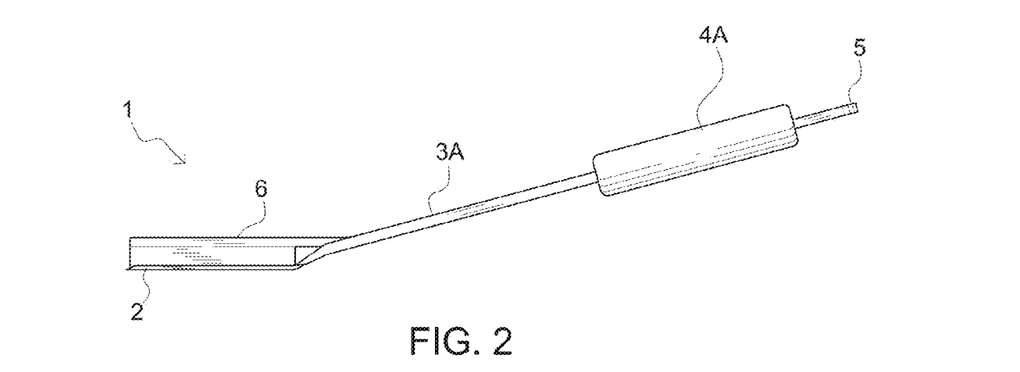
FIG. 2 depicts one embodiment of a left-side view of one embodiment of an improved spatula that incorporates a laterally oriented tong member, as depicted in FIG. 1.
Figure 3:
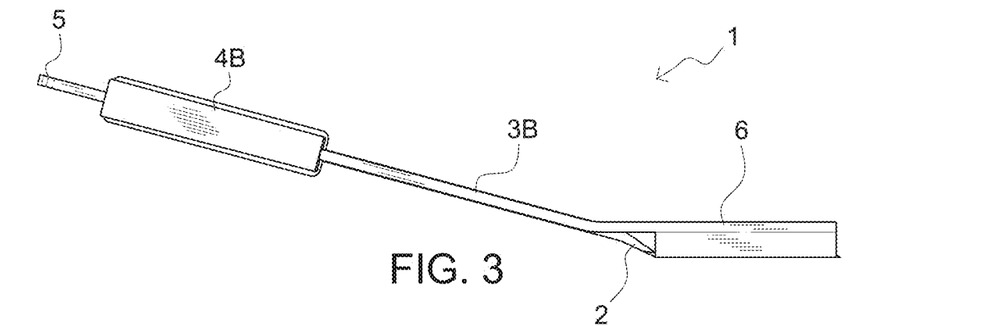
FIG. 3 depicts one embodiment of a right-side view of one embodiment of an improved spatula that incorporates a laterally oriented tong member, as depicted in FIG. 1.
Figure 4:
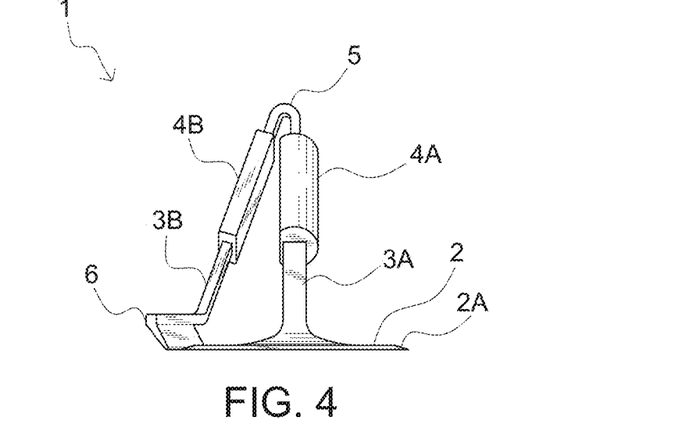
FIG. 4 depicts one embodiment of a front view of one embodiment of an improved spatula that incorporates a laterally oriented tong member, as depicted in FIG. 1.
Figure 5:
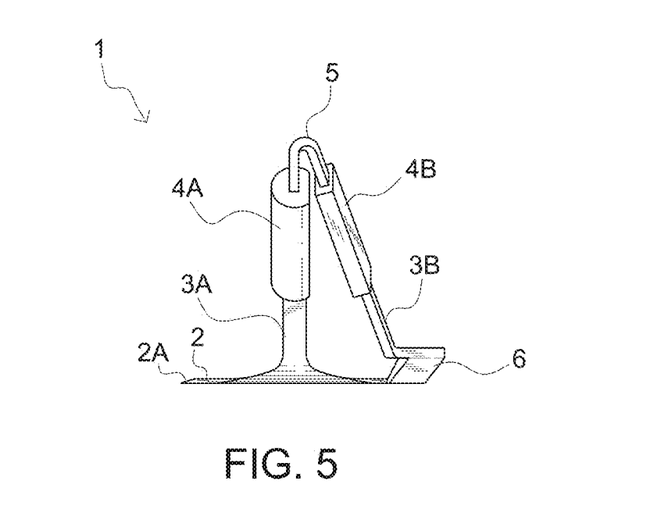
FIG. 5 depicts one embodiment of a rear view of one embodiment of an improved spatula that incorporates a laterally oriented tong member, as depicted in FIG. 1.
Figure 6:
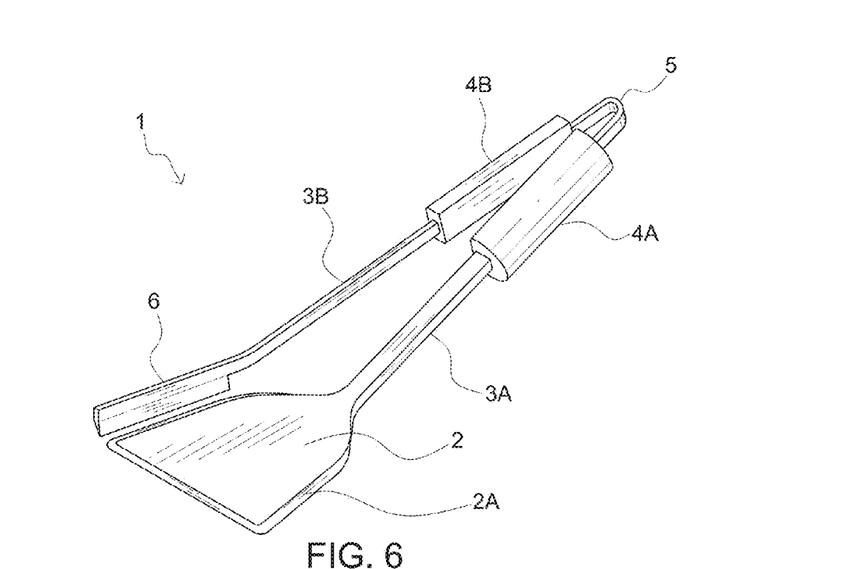
FIG. 6 depicts one embodiment of an isometric view of one embodiment of an improved spatula that incorporates a laterally oriented tong member, as depicted in FIG. 1, with the tong member collapsed against the spatula member.
Figures 7, 7A:
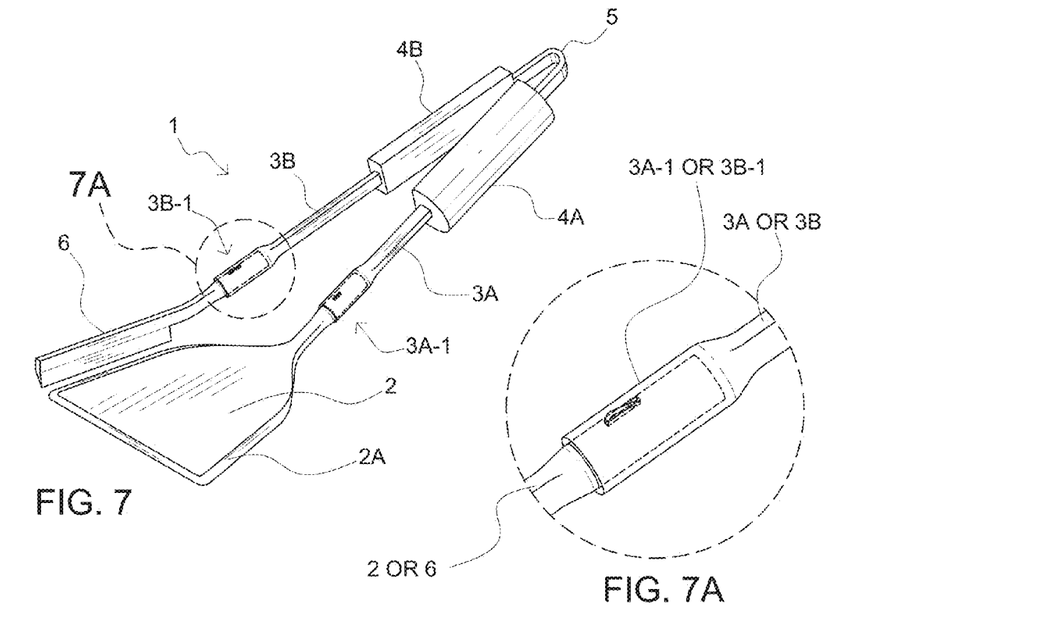
FIG. 7 depicts an alternate embodiment of an isometric view of one embodiment of an improved spatula that incorporates a laterally oriented tong member, as depicted in FIG. 1, with the tong member collapsed against the spatula member, wherein the tool heads at the end of each arm of the improved spatula have detachably coupled (and changeable) tool heads.
FIG. 7A provides an example close-up view of the detachably coupled tool head.
Figure 8:
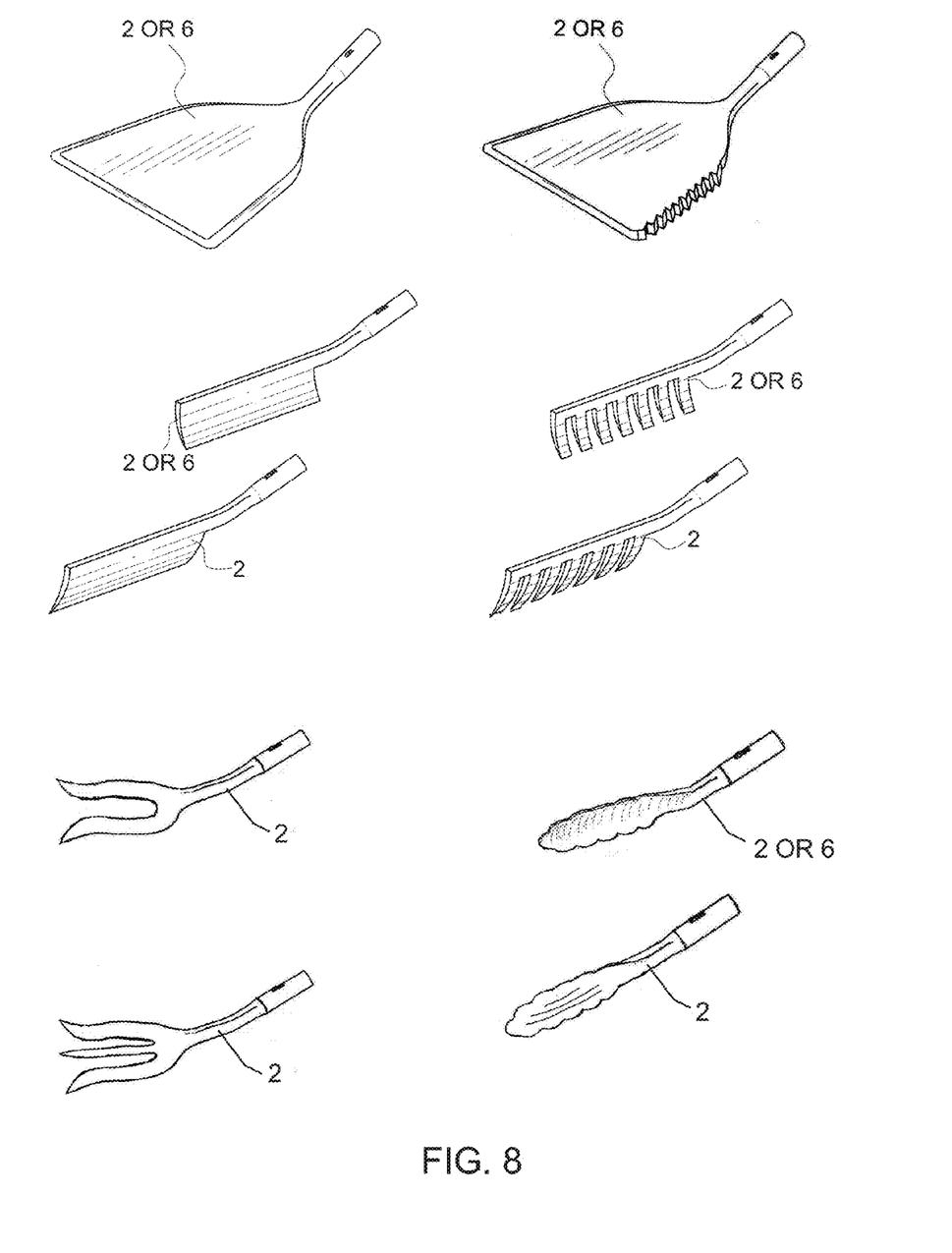
FIG. 8 depicts several embodiments of culinary tool heads that can be detachably coupled to the improved culinary tool depicted in FIG. 7, with the tool heads including two-pronged and three-pronged fork heads, a tooth-edged spatula head, scalloped-tong heads, toothed tong heads (which can also be used as a pasta fork), and smooth-edged tong heads.

In still more embodiments, the improved spatula-tong combination device 1 has a means by which a user can detachably couple, remove, and replace the tool-head 2, 6 members. FIGS. 7-8 depict an exemplary embodiment of this capability by employing a spring-clip coupling assembly 3A-1, 3B-1 to facilitate the detachable coupling, though other means known in the art (e.g., screw-on, interference-fit, etc.) can be used in variations. This capability not only allows a user to turn the improved spatula-tong combination device 1 into a regular pair of culinary tongs with user-selected tong heads, but also allows a user to change an improved spatula-tong combination device 1 featuring the spatula-side-tong interface from a right-handed configuration to a left-handed configuration. In other variations, the changeable tool heads 2, 6 are selected from the group consisting of spatula member, gathering member, two-pronged meat fork, three-pronged meat fork, pasta fork, and tong, as the user sees fit. In still another variation, a user can install a spatula member 6 on each elongated handle member 3A, 4A; 3B, 4B whereby a target food item 7 can be slidably engaged from each side of the target food member 7 and the two spatula members 6 when brought together effectively act as one wide spatula.

Finally, in some embodiments, the improved spatula-tong combination device 1 also incorporates a position-locking means to hold said first and second elongated handle members 3A/4A, 3B/4B substantially parallel to one another against said mechanical bias to hold said elongate handle members 3A/4A, 3B/4B open. Such position-locking means can be a slidable clamp, or any of a number of well-known devices already used for spring-loaded tongs in the industry.

V. A Method of Making an Improved Spatula-Tong Combination Culinary Tool

This Section IV is generally directed to embodiments of a method of making an improved spatula-tong combination device for use in the culinary arts, wherein the tong (/gathering) member is coupled to the grip shaft of the spatula member in a way such that the tong (/gathering) member is movable to and from one of the sides of the spatula member via a hinge or other pivotable/rotatable coupling, and wherein the hinged/pivotable/rotatable coupling is disposed such that the tong (/gathering) member can bias food on a cooking surface onto the spatula from the side of the spatula. That is, the axis of rotation of the tong (/gathering) member is orthogonal with respect to the planar surface of the spatula.

Refer to FIGS. 1-9. In an embodiment, the method comprises the steps of:

Providing a first elongate member 3A with a first handle member 4A (hereinafter a first elongate handle member 3A/4A) having a first end and a second end;

Providing a second elongate member 3B with a second handle member 4B (hereinafter a second elongate handle member 3B/4B) having a first end and a second end;

Providing a pivotable/rotatable coupling 5 is disposed between the first end of the first elongate handle member 3A/4A and the first end of the second elongate handle member 3B/4B, wherein the pivotable coupling 5 is mechanically biased to cause the first and second elongate handle members 3A/4A, 3B/4B to be positioned apart at a predetermined "open" angle relative to each other, and the second ends of the first and second elongate handle members 3A/4A, 3B/4B can be pivoted toward each other by user force. (The pivotable coupling 5 can be of any of many configurations already well-known in the art that are used for culinary tongs, such as, for example, as single curved-metal member with spring-like characteristics or a spring-hinge. In variations, the mechanically biased predetermined "open" angle between said first and second elongate handle members 3A/4A, 3B/4B when positioned apart is greater-than-or-equal-to 15 degrees and less-than-or-equal-to 45 degrees.);

Providing a spatula member 2 disposed at the end of said first elongate handle member 3A/4A (with or without beveled edges 2A at its exposed peripheral edges, sloping from the top surface plane to the bottom surface plane) that has a generally flat top and bottom planar surface disposed at the second end of the first elongate handle member 3A/4A, wherein relative to the first elongate handle member 3A/4A, the spatula member 2 has a distal edge, a right edge, and a left edge for slidably engaging food; and Providing a gathering member 6 disposed at the second end of the second elongate handle member 3B/4B, wherein the gathering member 6 has a distal end and a proximal end, relative to the second end of the second elongate handle member 3B/4B, wherein the gathering member 6 has a top edge and a bottom edge, with the bottom edge substantially aligned with at least one of the spatula member's 2 left or right edges when the first and second elongate handle members 3A, 4A; 3B, 4B are pivoted toward each other to be substantially parallel with one another.

It should be appreciated by those skilled in the art that even though the Figures depict the second elongate handle member 3B/4B as disposed on the right-hand side of the first elongate handle member 3A/4A, in other embodiments, the second elongate handle member 3B/4B can be disposed on the left-hand side of the first elongate handle member 3A/4A, which some users [e.g., left-handed users] might prefer when trying to bias a target food item onto the spatula member 2.

This embodiment can be further extended wherein most of the surface area of the gathering member 6 is substantially orthogonally oriented relative to the planar surface of the spatula member 2 when drawn together. In variations, the surface area of the gathering member 6 has a lower edge without gaps adapted to slidably interact with a flat cooking surface to help a user gather liquids/sauces from a food surface onto the spatula 2 surface. In still more optional embodiments, the bottom edge of the gathering member 6 is angled toward said closest spatula member 2 edge in order to enhance the ability of the gathering member's 6 bottom edge to scrape and capture liquids and substances and direct them onto the spatula member 2 when the first and second elongated handle members 3A/4A, 3B/4B are manipulated toward each other.

This embodiment can be further extended wherein the spatula member 2 is polygonal shaped with an expanding width toward the distal end to form an angle that aids the parallel mating of a side edge of the spatula member 2 with the lower edge of the gathering member 6.

This embodiment can be further extended wherein the major components of the improved combination culinary tool 1 are substantially comprised of high-temperature-resistant, rigid materials selected from the group comprising stainless steel, carbon composite materials, heat-resistant plastics, wood, and a combination of any of the aforementioned materials.

This embodiment can be further extended wherein the surface areas of one or more of the tool heads 2, 6 of the improved combination culinary tool 1 are comprised of non-stick material, which can include polytetrafluoroethylene (PTFE).

This embodiment can be further extended wherein to aid in the effectiveness of the improved spatula-tong combination device 1, the first and second elongate handle members 3A, 4A; 3B, 4B, when closed together, are each angled upward from said spatula member planar surface at a predetermined angle. In variations, that predetermined upward angle is greater-than-or-equal to 15 degrees and less-than-or-equal-to 45 degrees.

This embodiment can be further extended wherein the spatula member 2, includes at least one planar edge that is configured with teeth-like structures for tenderizing. In additional embodiments, at least one of the top or bottom edges of the gathering member 6 includes a plurality of gripping protrusions (e.g., "teeth-like" structures, tines, and/or scalloped edges).

This embodiment can be further extended wherein the method further comprises the step of providing a means by which a user can detachably couple, remove, and replace the tool-head 2, 6 members. (FIGS. 7-8 depict an exemplary embodiment of this capability by employing a spring-clip coupling assembly 3A-1, 3B-1 to facilitate the detachable coupling, though other means known in the art [e.g., screw-on, interference-fit, etc.] can be used in variations.) This capability not only allows a user to turn the improved spatula-tong combination device 1 into a regular pair of culinary tongs with user-selected tong heads, but also allows a user to change an improved spatula-tong combination device 1 featuring the spatula-side-tong interface from a right-handed configuration to a left-handed configuration. In other variations, the changeable tool heads 2, 6 are selected from the group consisting of spatula member, gathering member, two-pronged meat fork, three-pronged meat fork, pasta fork, and tong, as the user sees fit. In still another variation, a user can install a spatula member 6 on each elongated handle member 3A, 4A; 3B, 4B whereby a target food item 7 can be slidably engaged from each side of the target food member 7 and the two spatula members 6 when brought together effectively act as one wide spatula.

This embodiment can be further extended wherein the method further comprises the step of providing a position-locking means to hold said first and second elongated handle members 3A/4A, 3B/4B substantially parallel to one another against said mechanical bias to hold said elongate handle members 3A/4A, 3B/4B open. Such position-locking means can be a slidable clamp, or any of a number of well-known devices already used for spring-loaded tongs in the industry.

V. Methods of Using an Improved Spatula Culinary Tool

This Section V is generally directed to a methods-of-use for embodiments of an improved spatula-tong combination device for use in the culinary arts according to Section III, supra.

Figure 9:
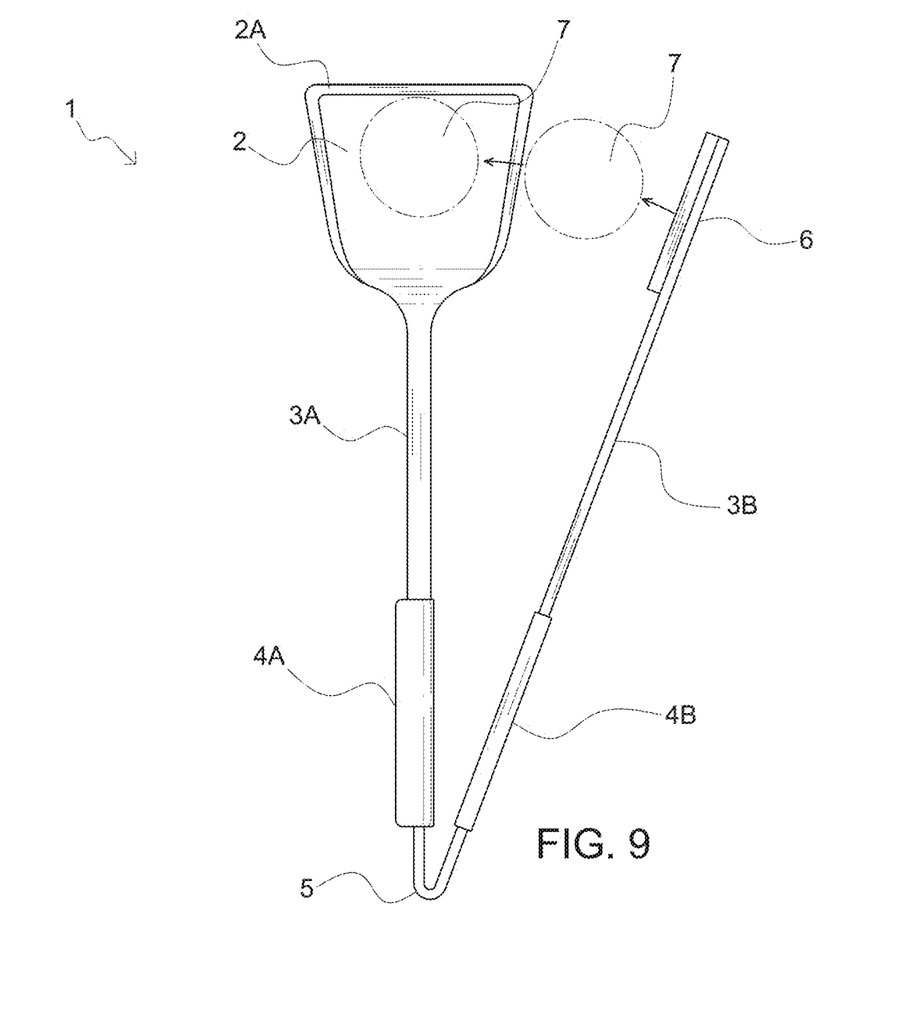
FIG. 9 depicts one embodiment of a top view of how an improved spatula that incorporates a laterally oriented tong member can be used to influence a target food item onto the spatula member via one of the side edges of the spatula member.

Refer to FIGS. 1-9. The method comprises the steps of:
By a user, obtaining a combination culinary tool 1 according to Section III, supra;
By a user, identifying a target food item 7 to remove from a cooking surface;
By a user, grasping the combination culinary tool 1 by its first and second elongated handle members 3A/4A, 3B/4B, with the culinary tool in its open position;

By a user, positioning the target food item 7 between the side edge of the spatula member 2 of the combination culinary tool 1 that is closest to gathering member 6 of the combination culinary tool; and By a user, causing the gathering member 6 to contact the target food item 7 and slide the target food item 7 upon the spatula member 2.

This embodiment can be further extended, wherein the gathering member's 6 surface area has a lower edge without gaps adapted to slidably interact with a flat cooking surface to help a user gather liquids/sauces from a food surface onto the spatula 2 surface, and the method further comprises the step of causing the gathering member 6 to push liquid or sauce disposed on the cooking surface to be gathered upon the spatula member 2.

This embodiment can be further extended; wherein the combination culinary tool 1 further comprises a means by which a user can detachably couple, remove, and replace the tool-head 2, 6 members (FIGS. 7-8 depict an exemplary embodiment of this capability by employing a spring-clip coupling assembly 3A-1, 3B-1 to facilitate the detachable coupling, though other means known in the art [e.g., screw-on, interference-fit, etc.] can be used in variations.); and the method further comprises the step of, by a user, selecting a tool head 2, 6 to be detachably coupled to the first elongated handle member 3A/4A and/or the second elongated handle member 3B/4B; and engaging a target food item with the combination culinary tool's 1 coupled tool-head members 2, 6.

VI. Alternative Embodiments and Other Variations

The various embodiments and variations thereof described herein, including the appended Claims and/or illustrated in the accompanying Figures are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the Description, Claims, and Figures herein.

What is claimed is:

1. An improved combination culinary tool, comprising:
   a first elongate handle member and a second elongate handle member, each having a first end and a second end;
   a pivotable coupling between the first end of said first elongate handle member and the first end of said second elongate handle member,
      wherein said pivotable coupling is mechanically biased to cause said first and second elongate handle members to be positioned apart at a predetermined open angle relative to each other;
   a spatula member with a generally flat top and bottom planar surface disposed at the second end of said first elongate handle member,
      wherein relative to said first elongate handle member, said spatula member has a distal edge, a right edge, and a left edge for slidably engaging food; and
   a gathering member disposed at the second end of said second elongate handle member, wherein:
      said gathering member has a distal end and a proximal end, relative to said second end of said second elongate handle member,
      said gathering member has a top edge and a bottom edge, said bottom edge substantially aligned with at least one of said spatula member's left or right edges when said first and second elongate handle members are pivoted toward each other to be substantially parallel with one another,
      said spatula member has a detachable coupling means between said first elongate handle member and said spatula member in order to facilitate the changeout of said spatula member with another tool head, and
      most of the surface area of said gathering member is substantially orthogonally oriented relative to said planar surface of said spatula member;
   wherein said gathering member can be pivoted by a user toward one of said spatula member's right edge or left edge to bias food laterally from a cooking surface onto said spatula member's planar surface.

2. The combination culinary tool of claim 1, wherein said mechanically biased predetermined open angle between said first and second elongate handle members when positioned apart is greater-than-or-equal-to 15 degrees and less-than-or-equal-to 45 degrees.

3. The combination culinary tool of claim 1, wherein said first and second elongate handle members, when closed together, are each angled upward from said spatula member planar surface at a predetermined angle.

4. The combination culinary tool of claim 3, wherein said predetermined upward angle is greater-than-or-equal to 15 degrees and less-than-or-equal-to 45 degrees.

5. The combination culinary tool of claim 1, wherein at least one of said edges on said spatula member are beveled from the top surface to the bottom surface.

6. The combination culinary tool of claim 1, wherein said spatula member's surface is coated with a non-stick material that is comprised of polytetrafluoroethylene (PTFE).

7. The culinary tool of claim 1, wherein when said first and second elongate handle members are pivoted toward each other to be substantially parallel with one another, said gathering member's bottom edge is substantially parallel with at least one of said spatula member's left or right edges.

8. The combination culinary tool of claim 1, wherein said spatula member is polygonal shaped with an expanding width toward the distal end to form an angle that aids the parallel mating of a side edge of said spatula member with the lower edge of said gathering member.

9. The combination culinary tool of claim 1, wherein at least one edge of said spatula member is configured with teeth-like structures for tenderizing.

10. The combination culinary tool of claim 1, wherein the bottom edge of said gathering member is substantially flat and parallel relative to the closest edge of said spatula member when said first and second elongated handle members are manipulated toward each other.

11. The combination culinary tool of claim 10, wherein said bottom edge of said gathering member is angled toward said closest spatula member edge in order to enhance the ability of said gathering member bottom edge to scrape and capture liquids and substances and directed them onto said spatula member when said first and second elongated handle members are manipulated toward each other.

12. The combination culinary tool of claim 1, wherein at least one of the bottom edge or top edge of said gathering member has a plurality of gripping protrusions.

13. The combination culinary tool of claim 1, wherein at least one of the bottom edge or top edge of said gathering member has a scalloped edge.

14. The combination culinary tool of claim 1, wherein said changeable tool head is selected from the group consisting of spatula member, gathering member, two-pronged meat fork, three-pronged meat fork, pasta fork, and tong.

15. The combination culinary tool of claim 1, wherein said detachable coupling means is accomplished by a means selected from the group consisting of a spring-clip coupling assembly, a screw-on assembly, and an interference fit.

16. The combination culinary tool of claim 1, further comprising a detachable coupling means between said second elongate handle member and said gathering member in order to facilitate the changeout of said gathering member with another tool head.

17. The combination culinary tool of claim 16, wherein said changeable tool head is selected from the group consisting of spatula member, gathering member, two-pronged meat fork, three-pronged meat fork, pasta fork, and tong.

18. The combination culinary tool of claim 16, wherein said detachable coupling means is accomplished by a means selected from the group consisting of a spring-clip coupling assembly, a screw-on assembly, and an interference fit.

19. A method for making a combination culinary tool, comprising the steps of:
providing a first elongate handle member and a second elongate handle member, each having a first end and a second end;
providing a pivotable coupling between the first end of said first elongate handle member and the first end of said second elongate handle member,
wherein said pivotable coupling is mechanically biased to cause said first and second elongate handle members to be positioned apart at a predetermined open angle relative to each other;
providing a spatula member with a generally flat top and bottom planar surface disposed at the second end of said first elongate handle member,
wherein relative to said first elongate handle member, said spatula member has a distal edge, a right edge, and a left edge for slidably engaging food; and
providing a gathering member disposed at the second end of said second elongate handle member, wherein:
said gathering member has a distal end and a proximal end, relative to said second end of said second elongate handle member,
said gathering member has a top edge and a bottom edge, said bottom edge substantially aligned with at least one of said spatula member's left or right edges when said first and second elongate handle members are pivoted toward each other to be substantially parallel with one another,
said spatula member has a detachable coupling means between said first elongate handle member and said spatula member in order to facilitate the changeout of said spatula member with another tool head, and
most of the surface area of said gathering member is substantially orthogonally oriented relative to said planar surface of said spatula member;
wherein said gathering member can be pivoted by a user toward one of said spatula member's right edge or left edge to bias food laterally from a cooking surface onto said spatula member's planar surface.

20. The method of claim 19, wherein said mechanically biased predetermined open angle between said first and second elongate handle members when positioned apart is greater-than-or-equal-to 15 degrees and less-than-or-equal-to 45 degrees.

21. The method of claim 19, wherein said first and second elongate handle members, when closed together, are each angled upward from said spatula member planar surface at a predetermined angle.

22. The method of claim 21, wherein said predetermined upward angle is greater-than-or-equal to 15 degrees and less-than-or-equal-to 45 degrees.

23. The method of claim 19, wherein at least one of said edges on said spatula member are beveled from the top surface to the bottom surface.

24. The method of claim 19, wherein said spatula member's surface is coated with a non-stick material that is comprised of polytetrafluoroethylene (PTFE).

25. The method of claim 19, wherein when said first and second elongate handle members are pivoted toward each other to be substantially parallel with one another, said gathering member's bottom edge is substantially parallel with at least one of said spatula member's left or right edges.

26. The method of claim 19, wherein said spatula member is polygonal shaped with an expanding width toward the distal end to form an angle that aids the parallel mating of a side edge of said spatula member with the lower edge of said gathering member.

27. The method of claim 19, wherein at least one edge of said spatula member is configured with teeth-like structures for tenderizing.

28. The method of claim 19, wherein the bottom edge of said gathering member is substantially flat and parallel relative to the closest edge of said spatula member when said first and second elongated handle members are manipulated toward each other.

29. The method of claim 28, wherein said bottom edge of said gathering member is angled toward said closest spatula member edge in order to enhance the ability of said gathering member bottom edge to scrape and capture liquids and substances and directed them onto said spatula member when said first and second elongated handle members are manipulated toward each other.

30. The method of claim 19, wherein at least one of the bottom edge or top edge of said gathering member has a plurality of gripping protrusions.

31. The method of claim 19, wherein at least one of the bottom edge or top edge of said gathering member has a scalloped edge.

32. The method of claim 19, wherein said changeable tool head is selected from the group consisting of spatula member, gathering member, two-pronged meat fork, three-pronged meat fork, pasta fork, and tong.

33. The method of claim 19, wherein said detachable coupling means is accomplished by a means selected from the group consisting of a spring-clip coupling assembly, a screw-on assembly, and an interference fit.

34. The method of claim 19, further comprising a detachable coupling means between said second elongate handle member and said gathering member in order to facilitate the changeout of said gathering member with another tool head.

35. The method of claim 34, wherein said changeable tool head is selected from the group consisting of spatula member, gathering member, two-pronged meat fork, three-pronged meat fork, pasta fork, and tong.

36. The method of claim 34, wherein said detachable coupling means is accomplished by a means selected from the group consisting of a spring-clip coupling assembly, a screw-on assembly, and an interference fit.

37. A method for using a combination culinary tool, wherein said combination culinary tool is comprised of:
- a first elongate handle member and a second elongate handle member, each having a first end and a second end;
- a pivotable coupling between the first end of said first elongate handle member and the first end of said second elongate handle member,
  - wherein said pivotable coupling is mechanically biased to cause said first and second elongate handle members to be positioned apart at a predetermined open angle relative to each other;
- a spatula member with a generally flat top and bottom planar surface disposed at the second end of said first elongate handle member,
  - wherein relative to said first elongate handle member, said spatula member has a distal edge, a right edge, and a left edge for slidably engaging food; and
- a gathering member disposed at the second end of said second elongate handle member, wherein:
  - said gathering member has a distal end and a proximal end, relative to said second end of said second elongate handle member,
  - said gathering member has a top edge and a bottom edge, said bottom edge substantially aligned with at least one of said spatula member's left or right edges when said first and second elongate handle members are pivoted toward each other to be substantially parallel with one another, and
  - most of the surface area of said gathering member is substantially orthogonally oriented relative to said planar surface of said spatula member;
- wherein said gathering member can be pivoted by a user toward one of said spatula member's right edge or left edge to bias food laterally from a cooking surface onto said spatula member's planar surface;

the method comprising the steps of:
- by a user, obtaining said combination culinary tool;
- by a user, identifying a target food item to remove from a cooking surface;
- by a user, grasping said culinary tool by its first and second elongated handle members, with the culinary tool in its open position;
- by a user, positioning said target food item between the side edge of the spatula member of said culinary tool that is closest to gathering member of said culinary tool; and
- by a user, causing said gathering member to contact said target food item and slide said target food item upon said spatula member.

38. The method of claim 37, wherein said mechanically biased predetermined open angle between said first and second elongate handle members when positioned apart is greater-than-or-equal-to 15 degrees and less-than-or-equal-to 45 degrees.

39. The method of claim 37, wherein said first and second elongate handle members, when closed together, are each angled upward from said spatula member planar surface at a predetermined angle.

40. The method of claim 39, wherein said predetermined upward angle is greater-than-or-equal to 15 degrees and less-than-or-equal-to 45 degrees.

41. The method of claim 37, wherein at least one of said edges on said spatula member are beveled from the top surface to the bottom surface.

42. The method of claim 37, wherein said spatula member's surface is coated with a non-stick material that is comprised of polytetrafluoroethylene (PTFE).

43. The method of claim 37, wherein when said first and second elongate handle members are pivoted toward each other to be substantially parallel with one another, said gathering member's bottom edge is substantially parallel with at least one of said spatula member's left or right edges.

44. The method of claim 37, wherein said spatula member is polygonal shaped with an expanding width toward the distal end to form an angle that aids the parallel mating of a side edge of said spatula member with the lower edge of said gathering member.

45. The method of claim 37, wherein at least one edge of said spatula member is configured with teeth-like structures for tenderizing.

46. The method of claim 37, wherein the bottom edge of said gathering member is substantially flat and parallel relative to the closest edge of said spatula member when said first and second elongated handle members are manipulated toward each other.

47. The method of claim 46, wherein said bottom edge of said gathering member is angled toward said closest spatula member edge in order to enhance the ability of said gathering member bottom edge to scrape and capture liquids and substances and directed them onto said spatula member when said first and second elongated handle members are manipulated toward each other.

48. The method of claim 37, wherein at least one of the bottom edge or top edge of said gathering member has a plurality of gripping protrusions.

49. The method of claim 37, wherein at least one of the bottom edge or top edge of said gathering member has a scalloped edge.

50. The method of claim 37, wherein the combination culinary tool further comprises a detachable coupling means between said first elongate handle member and said spatula member in order to facilitate the changeout of said spatula member with another tool head, and the method further comprises the step of, by a user, uncoupling the tool head from the distal end of said first elongate member, then removably coupling a different user-selected tool head to the distal end of said first elongate member.

51. The method of claim 50, wherein said changeable tool head is selected from the group consisting of spatula member, gathering member, two-pronged meat fork, three-pronged meat fork, pasta fork, and tong.

52. The method of claim 50, wherein said detachable coupling means is accomplished by a means selected from the group consisting of a spring-clip coupling assembly, a screw-on assembly, and an interference fit.

53. The method of claim 37, wherein the combination culinary tool further comprises a detachable coupling means between said second elongate handle member and said gathering member in order to facilitate the changeout of said gathering member with another tool head, and the method further comprises the step of, by a user, uncoupling the tool head from the distal end of said second elongate member, then removably coupling a different user-selected tool head to the distal end of said second elongate member.

54. The method of claim 53, wherein said changeable tool head is selected from the group consisting of spatula member, gathering member, two-pronged meat fork, three-pronged meat fork, pasta fork, and tong.

55. The method of claim 53, wherein said detachable coupling means is accomplished by a means selected from the group consisting of a spring-clip coupling assembly, a screw-on assembly, and an interference fit.

* * * * *